US012252800B2

(12) United States Patent
Graves et al.

(10) Patent No.: US 12,252,800 B2
(45) **Date of Patent: *Mar. 18, 2025**

(54) CONTAINER FOR MULTI-PHASE PROCESSING

(71) Applicant: KINETIC SYSTEMS, INC., Livermore, CA (US)

(72) Inventors: Ronald Todd Graves, Livermore, CA (US); Maryam Khosroshahi, San Jose, CA (US); James R. Garstka, Chapel Hill, NC (US)

(73) Assignee: KINETIC SYSTEMS, INC., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,213

(22) Filed: Jul. 26, 2021

(65) Prior Publication Data

US 2022/0186397 A1 Jun. 16, 2022

Related U.S. Application Data

(63) Continuation of application No. 15/780,804, filed as application No. PCT/US2016/064437 on Dec. 1, 2016, now Pat. No. 11,072,868.

(60) Provisional application No. 62/262,710, filed on Dec. 3, 2015.

(51) Int. Cl.

| | |
|---|---|
| ***C25D 17/20*** | (2006.01) |
| ***B07B 1/22*** | (2006.01) |
| ***B08B 3/06*** | (2006.01) |
| ***C25D 17/24*** | (2006.01) |

(52) U.S. Cl.

CPC ................ *C25D 17/20* (2013.01); *B07B 1/22* (2013.01); *B08B 3/06* (2013.01); *C25D 17/24* (2013.01)

(58) Field of Classification Search

CPC ................................ C25D 17/20; C25D 17/22

USPC ........................................... 204/213; 366/234

See application file for complete search history.

(56) References Cited

U.S. PATENT DOCUMENTS

| | | | |
|---|---|---|---|
| 3,008,893 | A | 11/1961 | Belke et al. |
| 3,153,624 | A | 10/1964 | Jackson |
| 3,582,526 | A | 6/1971 | Campana |
| 3,627,279 | A | 12/1971 | Barton et al. |
| 4,015,831 | A | 4/1977 | Petzold |
| 4,445,993 | A | 5/1984 | Stutz et al. |
| 4,880,132 | A | 11/1989 | Coch et al. |

(Continued)

FOREIGN PATENT DOCUMENTS

DE 29901300 U1 4/1999

*Primary Examiner* — David L Sorkin

(74) *Attorney, Agent, or Firm* — Lando & Anastasi, LLP

(57) ABSTRACT

A container such as a barrel or drum is provided for processing of solid material or parts with a liquid. The container is designed with grooves leading to holes or slots in the side that draw liquid into the container due to the rotation of the container when it is immersed in a tank of liquid. The holes or slots have a small dimension in the direction of rotation to minimize the probability of solid material coming out of the container. The fluid flow caused by the rotation serves to increase the rate of solution replacement inside the container as well as to keep the solid material from falling out through the holes or slots. The container disclosed is useful in processes in the plating, etching, leaching, and surface finishing industries.

9 Claims, 7 Drawing Sheets

(56) References Cited

U.S. PATENT DOCUMENTS 11,072,868 B2 * 7/2021 Graves ...................... B08B 3/06

* cited by examiner

CONTAINER FOR MULTI-PHASE PROCESSING

CROSS-REFERENCE TO RELATED APPLICATIONS

This application is a continuation of U.S. patent application Ser. No. 15/780,804 (now U.S. Pat. No. 11,072,868) filed on Jul. 26, 2021 which, in turn, claims priority under 35 U.S.C. § 119(e) to U.S. Provisional Patent Application Ser. No. 62/262,710 entitled "CONTAINER FOR MULTI-PHASE PROCESSING," filed Dec. 3, 2015, which is hereby incorporated herein by reference in its entirety for all purposes.

FIELD

The present disclosure is directed toward a container that generates fluid flow through its rotation, and is useful for processing solid materials and liquids. Generally, such a container may be a barrel or drum that is used to hold solid materials or parts as they are moved into a tank of liquid that is used for treating the solid material or parts. This container is designed for processes such as barrel plating, chemical leaching or etching, or metal passivation. It may also be used in a process such as tumbling, which is used for stress relief or mechanical finishing. These processes may be used in the metal or parts finishing industries, metal reclamation, or dyeing industries, for instance. The present disclosure provides a device that is useful for improving the efficiency and capability of these processes.

BACKGROUND

In some material processing industries it is important to be able to contain and agitate a collection or aggregate of solid material, while at the same time promoting the mixing of a liquid with the solid material. This is true, for instance, in the case of electroplating when using a barrel plating system, which entails a perforated barrel that holds a large number of small metallic parts and rotates in order to mix them, while also supplying electrical potential to the collection of parts. It is also the case when a large number of small parts are to be processed using a liquid, for instance in a chemical leaching or etching process or a metal passivation process. It is also common in processes such as tumbling, which may be used for stress relief or mechanical finishing. These processes may be used in the metal or parts finishing industries, metal reclamation, or dyeing industries, for instance.

It is common in the processes mentioned above for the parts or solid materials to be placed into a container, such as a barrel or drum, which is then placed into a larger tank containing the liquid chemistry used for the process, as shown in FIG. 1. It is also common practice to rotate the barrel or drum in order to effect mixing of the solid and liquid materials involved in the process. In these processes, there is a chemical or electrochemical reaction taking place that involves the solid and liquid phases. For example, in a chemical reaction metal ions are removed (or change state) due to a specific chemical reaction and metal ions are removed (or deposited) via an electrolytic application such as electrochemical deposition, depending on the application. After the chemical process has been completed, it is common to rinse the solid material with a solvent such as water. This may be accomplished by moving the container to a tank of rinse water and immersing it, for instance.

A common problem in the aforementioned processes is that the chemical solution inside the barrel or container tends to become depleted of reactants over time, so it is desirable to replenish the used solution with fresh solution as the process continues. Also, as chemical reactions take place, reaction products and byproducts may build up, which can limit reaction rates or cause other deleterious effects. For this reason, it is useful to replenish the solution with fresh solution and remove the used solution from the container where the reaction takes place.

Another problem with these processes is that it is common for very small parts or solid materials to come out of the container through perforations and to fall into the larger tank, in which the barrel is contained. This may cause a loss of material, and will also result in fouling of the process tank, which will require cleaning in order to remove the solids that have accumulated. It may also result in increased maintenance of pumps, filters, and such, due to clogging or wear caused by the solid material in the fluid flow path.

SUMMARY

The present disclosure is directed toward a material handling system for processing small solid materials or parts with a liquid, while promoting intimate mixing of the liquid with all of the solid material or parts, and at the same time providing for replenishment of the liquid with fresh liquid as it is being utilized in the process. The device provides this capability, while at the same time minimizing the amount of solid material that falls out of the container during the mixing process. This is accomplished with a simple hardware design that is not excessively complicated or prone to mechanical failures.

As mentioned above, currently available devices utilize containers, such as barrels or drums, with perforations that allow solution mixing as the container is rotated in the liquid to promote mixing of the liquid with the solid material or parts. One disadvantage to conventional devices is that they are rotationally symmetric about the axis of rotation, and the perforations typically penetrate the container perpendicular to the direction of rotation. This means that the solution mixing and replenishment occurs by diffusion of chemical species through the perforations as the container is rotated, rather than by convection, which is a more efficient process for solution replenishment.

One method of compensating for this problem is to provide a larger opening at the exterior of the container surface to allow more solution access to the hole. This can be done using counter-bores 10 radially outward of holes 12 formed in a container wall 14, as shown in FIG. 1, or by using a screen-type plate or fabric at the interior surface of the container. Such a device may employ larger holes as perforations or provide a support structure for the screen which is located on the interior surface of the support structure. This method allows smaller holes 12 to be used at the interior surface 16 of the screen to keep the solid material or parts inside the container, while allowing the larger area of the counterbores 10 to provide better solution access (at least to the exterior surface 18 of the container wall 14). In some embodiments, at least one of the maximum dimension of the smaller holes is in the range of 0.125 inches to 2 inches. In these cases, however, convective mixing of solution is usually limited to the outer hole portion of the container and provides mixing down to the location of the screen, or smaller hole cross-section near the interior surface of the container. (Similar to FIGS. 2A and 2B)

Referring now to FIGS. 2A and 2B, another method of overcoming this problem with conventional devices is to provide perforations 20 inside larger pockets 22 of an aspect ratio and position such that they may be rotated above the surface 24 of the liquid in the larger tank 26 and the liquid in the pockets 22 can drain into the container 28 as they are rotated above the surface 24 of the liquid in the tank 26. Such a device may improve the transfer of the solution to the inside of the container 28, but primarily at the marginal rate provided by gravity acting on liquid trapped in the upper pockets 22 while they are above the surface 24 of liquid in the tank 26. Furthermore, the solution flow in such an arrangement is from the top of the container down, through the solids in the bottom of the container, which would tend to push the solids into, or through, the perforations at the bottom of the container. As solution pushes the solids down in this situation, it does two things. More products tend to be pushed out of the container 28 into the process bath of the tank 26, which causes lost yield and increased system maintenance. In the case of product that is not pushed out, the perforations 20 might become clogged by this product, reducing the ability of new chemical to enter.

Referring now to FIG. 3, another method of increasing the rate of replacement of solution in such a barrel or container has been to provide a pump to pump solution from the tank at the exterior of the container to the interior of the container, as in plating barrels of the "Spray Thru" design 30 manufactured by Hardwood Line Manufacturing Company, of Chicago, IL (U.S. Pat. No. 5,419,823). Such systems would provide excellent replacement rates of solution within the container, but at a relatively large cost, and with an increase in maintenance costs. Also, since the general direction of solution flow would be outward along a radius of a cylindrical container, the solution flow would tend to push the solid material out, or into, the perforations in the container, where it may clog the perforations.

The present disclosure is able to overcome the problems mentioned above through a unique design of slots (referred to sometimes herein as perforations, holes defined in a container wall, microchannels, grooves, trenches, veins, or geometric slots) within the sides of the material container, or barrel, that are designed to promote the flow of solution from the outside of the container to the inside of the container as it is rotated within the liquid. The slots or perforations are designed with a component of their shape substantially aligned with the direction of rotation to allow fluid to be easily drawn into the slots, or grooves, and another component of their shape designed to "scoop" the fluid from the exterior to the interior of the container. This design causes the rotation of the container to increase the pressure in the fluid at the exterior of the container at the perforation penetration area to cause fluid to enter the container through the perforations. The design of the slots in the container wall are like trenches, or veins, that allow easy access of the fluid to the trench due to their tapered angle, which is below the exterior surface of the container, with "scoops" at the trailing edge that help to push the fluid to the interior of the container. This design causes the rotation of the container itself to act as a pump to transfer fluid from the exterior of the container to the interior near the sidewalls, which makes the chemical processing more efficient by providing a good exchange of fresh fluid from the exterior of the container and preventing the product from exiting the container. Of course, there must be an exit path as well to allow solution transfer. This exit path can be near the rotation axis of the container, at one or both ends of the container. This design acts to draw fluid in at the outer circumference of the container as it rotates, and push it out near the axis of rotation. This flow is the reverse of that in a conventional centrifugal pump. As fresh reactant is pumped to the interior of the container through the slots, the chemical reaction time is decreased, which reduces the run time for the material processing.

Another design aspect of the slots (or trenches) is that the entrance to the interior of the chamber can be made small and nozzle-like. The small slot entrance that penetrates to the interior of the container may be made thin enough to effectively trap most of the solids or parts contained inside the chamber so they cannot fall out of the container into the outer tank. The interior penetration can also be cut through the interior sidewall in such a way as to be a slanted slot that would not allow a direct path of access from the interior of the container to the exterior of the container on a radial line of the container. In some embodiments, an S-shaped slot is used in place of a linear slanted slot. These aspects of the slot design all serve to keep the solid materials or parts inside the container and not let them fall out of the container while it rotates.

As described above, this design provides for a simple piece of hardware that can be manufactured in such a way as to provide active enhancement of the solution flow as the barrel or drum is rotated within a tank of fluid. This allows for replenishment of the used chemistry inside the drum with fresh chemistry from outside the barrel in order to improve reaction rates and reduce the deleterious effects of reaction byproducts accumulating within the drum. This hardware is not complicated or prone to mechanical failure, and has several additional advantages that will be described in more detail below.

According to one aspect of the present disclosure, a substantially cylindrical container is configured for holding solid material that is to be processed with a liquid. The container includes a generally cylindrical body rotatable about a longitudinal axis. A plurality of slots are formed in the body. Each slot extends generally in a circumferential direction with respect to the longitudinal axis. Each slot has a leading edge and a trailing edge. Each slot has a component of its shape substantially aligned with the circumferential direction. The leading edge is tapered toward the trailing edge. The leading edge is configured to direct a liquid to the trailing edge. The trailing edge is configured to direct a liquid from an exterior of the body to an interior of the body through the respective slot.

In some embodiments, the trailing edge is configured to direct a liquid to the interior of the body through a nozzle-like feature.

In some embodiments, each slot has a transverse width aligned with the circumferential direction. The transverse width is small relative to a length of the slot parallel to the longitudinal axis.

Some embodiments include a tapered edge on the trailing edge of each slot configured to prevent the solid material from falling out of the container along a radial direction.

According to another aspect of the present disclosure, a system for processing solid material includes a tank and a container for holding solid material that is to be processed with a liquid. The container includes a generally cylindrical body rotatable about a longitudinal axis. A plurality of slots are formed in the body. Each slot extends generally in a circumferential direction with respect to the longitudinal axis. Each slot has a leading edge and a trailing edge. Each slot has a component of its shape substantially aligned with the circumferential direction. The leading edge is tapered toward the trailing edge. The leading edge is configured to direct a liquid to the trailing edge. The trailing edge is configured to direct fluid from an exterior of the body to an interior of the body through the respective slot.

In some embodiments, the trailing edge is configured to direct a liquid to the interior of the body through a nozzle-like feature.

In some embodiments, each slot has a transverse width aligned with the circumferential direction. The transverse width is small relative to a length of the slot parallel to the longitudinal axis.

Some embodiments include a tapered edge on the trailing edge of each slot configured to prevent the solid material from falling out of the container along a radial direction.

In some embodiments, the liquid is useful for one of barrel plating, leaching etching, metal finishing, metal reclamation, and dyeing.

According to another aspect of the present disclosure, a container is configured for holding solid material that is to be processed with a liquid. The container includes a cylindrical portion having a cylindrical wall. The cylindrical wall has an outer surface and an inner surface. A plurality of circumferentially spaced apart slots are defined in the cylindrical wall and extend from the outer surface of the cylindrical wall to the inner surface of the cylindrical wall. Each slot of the plurality of circumferentially spaced apart slots is defined by a first edge portion forming a first edge of the slot and a second edge portion forming a second edge of the slot. The first edge portion extends at a first angle with respect to a first radial line from a center of the cylindrical portion to an outer edge of the first edge portion. The second edge portion extends at a second angle with respect to a second radial line from the center of the cylindrical portion to an outer edge of the second edge portion. The first angle is greater than the second angle.

In some embodiments, the first edge portion and second edge portion of each slot define a first opening on the outer surface and a second opening on the inner surface. The first opening is greater than the second opening.

In some embodiments, a circumferential distance from the outer edge of the first edge portion to the outer edge of the second edge portion is greater than a circumferential distance from an inner edge of the first edge portion to an inner edge of the second edge portion.

In some embodiments, the outer edge of the first edge portion is aligned with an axial direction of the cylindrical portion, and the outer edge of the second edge portion is aligned with the axial direction of the cylindrical portion.

In some embodiments, the outer edge of the second edge portion is radially outward of a part of the first edge portion.

In some embodiments, each slot is curved with respect to an axial direction of the cylindrical portion when the respective slot is viewed in a radial direction.

In some embodiments, the plurality of circumferentially spaced apart slots are arranged in axially spaced apart rows.

In some embodiments, the container has a closed second end, and a gear is secured to the closed second end. The gear is configured to engage a driving mechanism so that the driving mechanism can rotate the container about a longitudinal axis of the container.

In some embodiments, a frustoconical portion is secured to the cylindrical portion.

DETAILED DESCRIPTION

Figure 1:
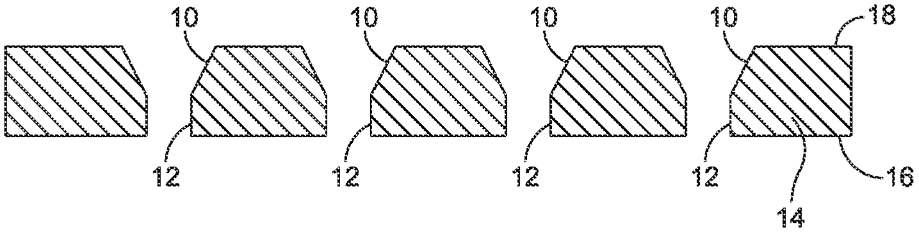
FIG. 1 (PRIOR ART)
FIG. 1 is a schematic illustration of a prior art device with exterior counter-bored holes to improve solution transfer through the sides of a barrel.
Figure 2B:
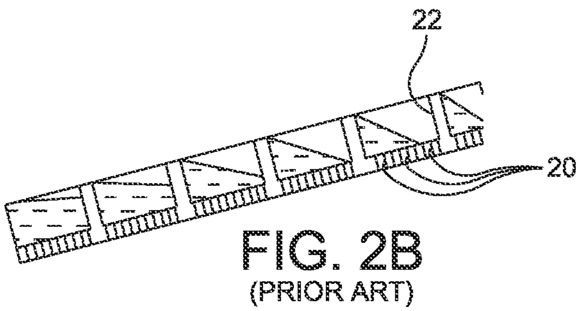
FIG. 2B (PRIOR ART)
FIG. 2B is an enlarged portion of FIG. 2A.
Figure 2A:
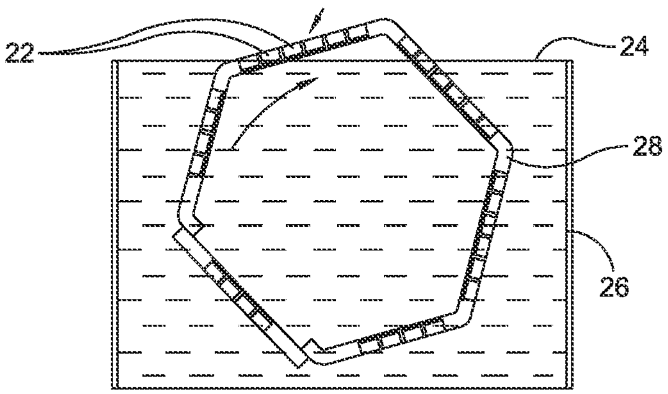
FIG. 2A (PRIOR ART)
FIG. 2A is another prior art device with small holes to hold solids inside, and larger cavities on the exterior to promote solution transfer.
Figure 3:
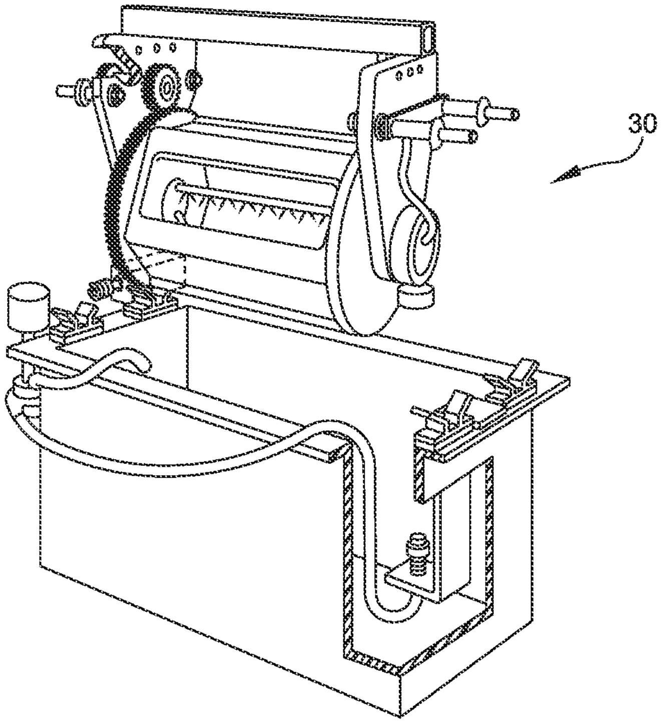
FIG. 3 (PRIOR ART)
FIG. 3 is another prior art device with pump to pump capability to promote solution transfer.

The present disclosure is directed toward hardware that is useful for processes that require the intimate mixing of solid materials or parts, and liquids. These processes may include barrel plating, leaching, extraction, passivation tumbling, dyeing and the like. A common aspect of these processes is the need to provide access of a liquid solution to a quantity of solid material or parts in such a way that fresh reactants in the liquid phase are mixed with the solids, and/or reaction products or byproducts are carried away from the solids. It is normal in many of these processes to transport a container containing the solid material or parts to a tank filled with liquid, and to use the container to hold the solids and to promote the mixing of the solids and the liquid. In some cases, it may also be necessary to provide additional energy to the container, such as providing an electrical voltage in the case of barrel electroplating to cause the deposition of metallic ions onto the parts as a metal film or coating. It is useful during these processes to allow fresh chemistry to enter the container during processing, and to allow used or spent chemistry to exit the container in order to promote the rate of chemical or electrochemical reactions taking place. The container may then be moved to a rinse tank where a rinsing solution such as water flows through the solids in order to remove any additional chemistry from the solid material or parts. While a basket that holds the parts as they are transferred from one tank to the next may be used in some cases, this disclosure is directed more to the cases where a barrel or drum holds the parts and is rotated during processing in order to enhance the agitation and intimate mixing of the solid material and liquids contained within.

Conventional devices utilize containers or barrels with perforations to allow access of solution to the interior of the container. In some cases, the end of a specialized barrel may also be open in order to allow solution access. These devices usually include a means for providing rotation in order to promote mixing of the solids and liquids, and could also provide features such as baffles on the interior of the container to promote mixing and agitation of the solids inside the container.

Conventional systems use perforations that are smaller than the parts being processed in order to contain the solids inside the barrel, and may employ devices such as screens to provide structure and fluid access while minimizing the hole size through which solids could exit the container. A problem arises, however, when the solids consist of a mixture of part sizes or particle sizes, especially in cases where the solid material has been produced by some kind of a crushing or milling operation. In such a case, there will be a range of sizes of the solid material, and it is difficult to provide a hole or screen size that will not allow any of the solids to fall out of the container. In such a situation, it may be necessary to screen the incoming solid materials and process the fine solids differently than the coarser solids, or to choose a different type of processing apparatus.

In addition, when perforations in the container sidewall are oriented perpendicularly to the sidewall and the axis of rotation, the only convective processes that enhance solution transfer across the smallest diameter pore, or perforation, are those caused by vortices due to viscous shear of the solution due to the relative velocity of the container and the solution near the perforation or hole in the container or screen.

Figure 4:
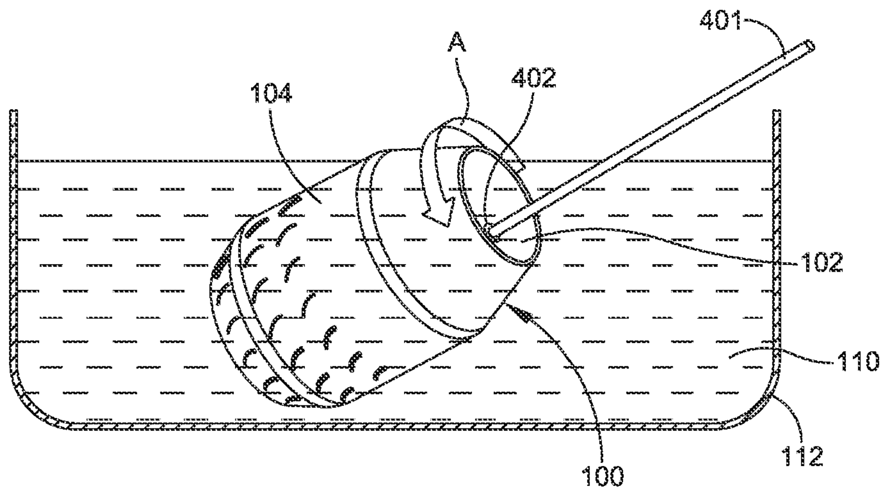
FIG. 4 is a schematic illustration of a system for processing solids with liquids in a rotating barrel in a tank of liquid.
Figure 5A:
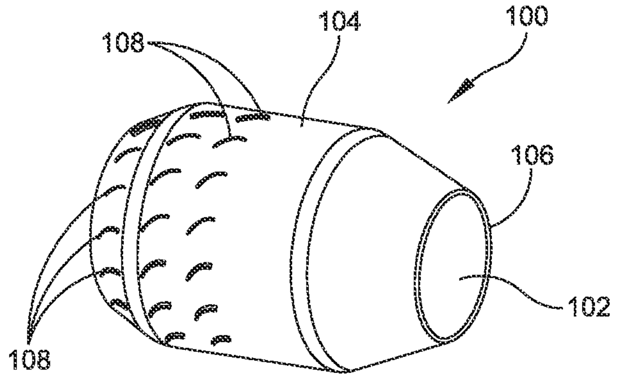
FIG. 5A is a another schematic illustration of an embodiment of the container of the present disclosure.

The present disclosure describes a container (or barrel) 100 which provides for enhanced solution flow into, and through, the container (or barrel) 100, while at the same time not compromising the ability of the container 100 to hold solid material within an interior 102 of the container 100, even if the solid particle size is small or varying, such as in the range of 5 microns to 2 inches in diameter. The present disclosure accomplishes this by utilizing features that help to direct fluid into the container 100 as it rotates, which promotes the solution flow into the container 100 at the sidewalls 104. An exemplary embodiment of the container is shown in FIG. 5A, and is designed as an obliquely oriented barrel 100 with an open end 106, which allows for the exit of spent or used solution from the upper open end 106 of the container 100. This embodiment of the container 100 of the present disclosure is able to overcome the problems mentioned above through a unique design of slots 108 (or perforations) within the sidewalls 104 of the material container 100. The slots 108 are are designed to promote the flow of solution from the outside of the container 100 to the inside 102 of the container 100 as the container 100 is rotated within the liquid 110 in the tank 112 in the exemplary system for processing solid material shown in FIG. 4. The slots 108 are designed with a component of their shape (a leading edge) substantially aligned with the direction of rotation A and tapered to allow fluid to be easily drawn into the slots (or grooves) 108, and another component (a trailing edge) of their shape designed to "scoop" the fluid from the exterior to the interior of the container. This design causes the rotation of the container to increase the pressure in the fluid at the exterior of the container 100 at the interior wall penetration area to cause fluid to enter the container through the slots (perforations) 108. The design of the slots 108 in the container wall are like trenches, or veins, that allow easy access of the fluid to the trench, which is below the exterior surface of the container, with "scoops" at the trailing edge that help to push the fluid to the interior of the container. The liquid compresses and behaves as if pressurized so liquid flow is directed into the container through the slots and then out of the container through the open end of the container. This design causes the rotation of the container itself to act as a pump to transfer fluid from the exterior of the container to the interior near the sidewalls. Of course, there must be an exit path as well to allow solution flow. This exit path can be near the rotation axis of the container, at one or both ends. In the embodiment of FIG. 5A, the exit path is at the open end 106 of the container 100. This design acts to draw fluid in at the outer circumference of the container as the container 100 rotates, and push it out near the axis of rotation. This flow is the reverse of that in a conventional centrifugal pump. The container 100 may preferably be designed with a multitude of such slots 108 to provide solution flow into the container 100. It will be recognized that the number of slots 108 may be chosen to optimize the amount of fluid flow into the container 100, while not compromising the structural integrity of the container 100.

Figure 5B:
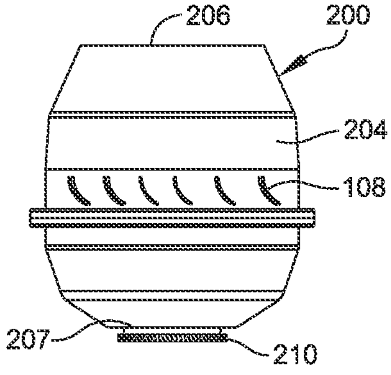
FIG. 5B is a view of a container of the present disclosure with a gear secured to an end of the container.

FIG. 5B shows an embodiment of a container 200 having an upper open end 206 and a closed base 207. The container 200 includes slots (perforations) 108 defined in a wall 204 of the container 200. A gear 210 is secured to the closed base 207 to allow a motor to drive the rotation of the container 200 about the longitudinal axis of the container extending between the closed base 207 and the open end 206 of the container 200.

Figure 6:
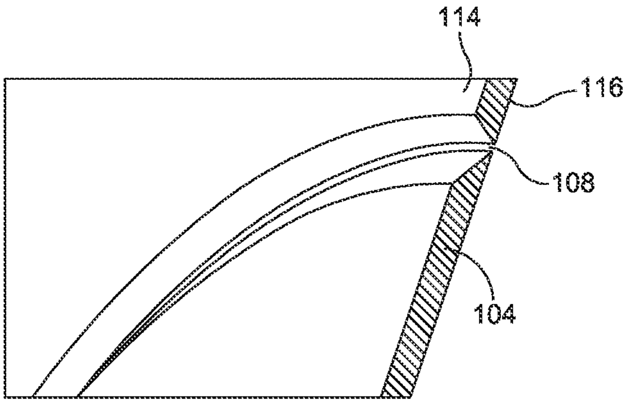
FIG. 6 is a schematic illustration of an embodiment of the disclosure that shows one design of slots that can be used to provide fluid flow into a container.

FIG. 6 shows a sectional view of an embodiment of the disclosure that shows one design of a slot 108 that can be used to provide fluid flow into a container 100. The slot extends from an outer surface 114 of the wall 104 to an inner surface 116 of the wall 104.

Figure 7:
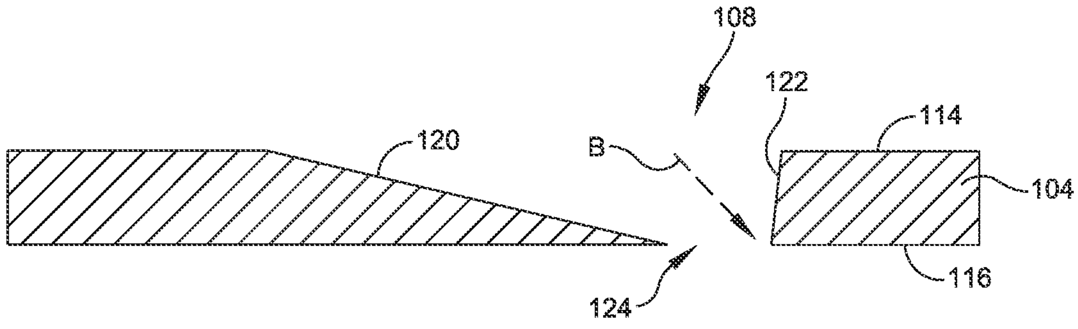
FIG. 7 is a schematic illustration of a cross-section through a slot in an embodiment of the disclosure.

One way to make the grooves and holes in the surface of the container is to simply drill holes in the sidewall 104 of the container 100 in an orientation that is almost tangential to the exterior surface of a substantially cylindrical container. By drilling holes with a slight angle to the tangent to the exterior surface 114, grooves may be formed in the exterior surface 114 of the container 100, which lead to a scooping feature where the holes penetrate the container wall 104, as seen in FIG. 7. Additionally, the holes will be such that the solid material inside the container 100 will traverse the leading edge 120 so as to fall to the trailing edge 122 of the holes if the container is rotated in the proper direction. This will minimize the chances of solid material exiting the container through the holes as the container is rotated. Furthermore, the cross sectional area of the portion of the holes that penetrates to the interior of the container may be made smaller than the cross sectional area of the holes at the exterior of the container, in order to provide nozzle-like features where solution enters the interior of the container. This may be done by using a tapered drill bit, or by drilling smaller penetrating holes in larger holes which do not penetrate through to the interior of the container. In this way, the pressure may be increased at the exterior portion of these nozzles, which will help to cause solution flow from the outside to the inside of the container. FIG. 7 shows the leading edge 120 tapered towards the trailing edge 122. A re-entrant profile B of fluid entering the container 100 is shown as passing through the small opening 124 defined on the inner surface 116 of the wall 104 between the leading edge 120 and the trailing edge 122 of the slot 108.

Therefore, one embodiment of the present disclosure is a barrel or drum 100 with slots (holes or perforations) 108 bored at an oblique angle such that they are almost on a tangent to the circumference of the container. The holes 108 penetrate the container wall in such a way as to provide elongated slots on the exterior surface of the container, with walls at their trailing edge (as the barrel rotates) that are dimensioned and configured to scoop fluid into the holes penetrating to the interior of the container. Preferably, the cross-sectional area of the holes that penetrate the interior wall of the container are smaller than the cross-sectional area of the holes that penetrate the exterior wall of the container. It is not necessary to drill the holes at an angle that is exactly perpendicular to the axis of rotation. In some embodiments, the holes are pitched at an angle of five or ten degrees, or even 20 degrees from perpendicular to the axis of rotation. In a further variation on this embodiment, it may be preferable to design the penetrations to the interior of the container in such a way that as material slides or tumbles around the interior of the container when the container is rotated, it cannot fall out through the penetrations directly to the exterior of the container. That is to say that if a line is drawn from the axis of rotation perpendicular to the sidewall of the container through any part of a penetration of the interior sidewall, it does not pass completely through to the exterior of the container. The angle of the holes is designed such that material would fall through a penetration of the interior sidewall to land on the sloped portion of the hole in the sidewall, where it would come back to the interior of the container as the container continues to rotate.

Figure 8:
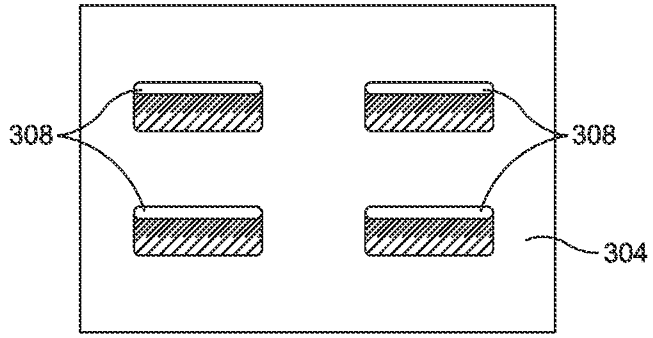
FIG. 8 is a schematic drawing showing a radial view of a design for slots in the container wall in one embodiment of the present disclosure.

Referring now to FIG. 8, in another aspect of the disclosure, it is desirable to have the penetrations of the interior sidewall of the container formed as long, narrow holes or slots 308 formed in the container wall 304, in order to allow for sufficient cross-sectional area of the slots 308 to allow a reasonable amount of fluid flow into the container, while still limiting the ability of the solid material or parts in the container to fall out through the holes. In this case, the width of each hole penetrating to the interior, which is oriented substantially perpendicular to the direction of rotation, is kept sufficiently small to not allow the solid material or parts inside the container to fall out through the slot. The corresponding embodiment of the disclosure has narrow slots opening into the interior of the container (barrel or drum), with a shallow slope to the exterior of the container on their leading edge, and a bluff or scooping feature on their trailing edge. In this manner, fluid from the exterior of the container is scooped into the interior of the container as the container is rotated. In this embodiment, the container acts similarly to a squirrel cage fan, but with the fluid flow in the reverse direction. Accordingly, the fluid is drawn into the container at its outer edge, where it is allowed to mix with the solid material inside the container, before it exits the container near its axis of rotation. The container acts as a pump impeller, with the solid material or parts contained inside. The small slot penetrations to the interior of the container, along with the scooping feature provides a nozzle-like increase in pressure just exterior to the entrance to the interior of the container, which drives the flow of fluid toward the interior.

In a further variation on this embodiment, it may be preferable to design the penetrations to the interior of the container in such a way that as material slides or tumbles around the interior of the container when the container is rotated, it cannot fall out through the penetrations directly to the exterior of the container. That is to say that if a line is drawn from the axis of rotation perpendicular to the sidewall of the container through any part of a penetration of the interior sidewall, it does not pass completely through to the exterior of the container. The angle of the holes is designed such that material would fall through a penetration of the interior sidewall to land on the sloped portion of the hole in the sidewall at the trailing edge, where it would come back to the interior of the container as the container continues to rotate.

In another embodiment of the disclosure, the two aspects outlined above are combined, in order to provide a more efficient device for directing and controlling the solution flow into the container, while minimizing the opportunity for solid material or parts to come out of the container. In this embodiment, grooves are provided on the exterior surface of the container to allow the solution to be entrained in the grooves as the container is rotated. The grooves are substantially aligned with the direction of rotation near their leading edges in order to make it easy for the fluid to enter the grooves and flow at a velocity near the relative velocity of the outer wall of the container. The grooves are designed so as to curve such that their trailing edges become substantially perpendicular to the direction of rotation, where they open into the interior of the container through long, narrow slots. This embodiment allows the use of the grooves to help entrain and control the flow of fluid on the exterior of the container, while also providing the advantages outlined above relative to having narrow slots to direct flow of fluid to the interior of the container. The curvature of the grooves as they transition from being aligned with the direction of rotation at the leading edge to being perpendicular to the direction of rotation at the trailing edge, is designed so as to allow efficient solution flow as the fluid is directed along the curvature of the grooves from the leading edge to the trailing edge. As in the embodiments described above, the slots may preferably be designed to have a transverse dimension smaller than the transverse dimension of the outer portion of the grooves, in order to provide a nozzle-like feature, which serves to increase the fluid pressure just outside of the slots that penetrate to the interior of the container. The sidewalls of the slots may also be tapered so as to not allow solids to fall out of the container.

In yet another embodiment of the disclosure, it is desirable to use the container as part of an electrochemical process such as barrel electroplating, or barrel plating. In a barrel plating process, metal parts are typically placed into a barrel such as that indicated in FIG. 4 and moved to a tank of electroplating solution, as is well known in the art. It may be desirable to immerse the barrel containing its load of parts in a pretreatment tank and/or a rinse tank prior to immersion in the electroplating solution. Once the barrel with its load of parts is immersed in the electroplating solution, an electrical potential may be applied between the barrel and its parts and an anode, as is commonly used for plating processes. The electrical potential may be applied by controlling the voltage, or by controlling the current flow between the electrodes.

In the barrel plating application, current is directed to electrodes inside the barrel, which come into contact with the metallic parts contained inside. The current may then flow through the parts that are momentarily in contact with each other to be spread among the parts where it can become available to supply electrons to the wetted surfaces to promote reduction of metal ions in the solution which are plated as metal on the parts. Since the parts are continually moving while they are being coated with metal, new surfaces are continually contacting other parts and becoming exposed to the plating chemistry. This action allows for a uniform metal deposition on all surfaces of small parts that can be plated inside the rotating barrel.

In order to direct the current to electrodes in the interior of the barrel, it is necessary to provide some method of making electrical connection to a bus bar. This is typically done by using a conductive hook that is capable of routing current from the bus bar to a cable or wire that is attached to the electrode inside the barrel. This electrode commonly takes the form of a "dangler" 401 which extends from the axis of the container near the open end of the container to its interior of the container, where the dangler 401 can make electrical contact to the parts that are inside the barrel at an electrode end 402 of the dangler 401. These electrical connections and electrodes could take other forms while still utilizing the present disclosure to allow for enhanced fluid flow and replenishment inside the barrel. The present design is useful for improving the flow of fresh electroplating solution and maintaining the concentration of metal ions available to be plated. This may also allow the use of higher currents and faster plating rates which would make the plating process more efficient. It may also be recognized that a reversed current could be used to allow electrochemical etching or electropolishing of the parts inside the barrel with similar advantages to those described for electroplating.

In an embodiment of the disclosure, a container, or barrel, is provided to contain solid parts or material that is to be intimately mixed with a liquid in a material handling or chemical process. The container is preferably provided with an open end that allows it to be inserted obliquely into a tank of liquid and for liquid to quickly fill the submerged portion of the container. Additionally, the container is provided with features that promote the fluid flow of solution into the interior of the container as it is rotated about its own axis. These features are formed by cutting, molding, or otherwise producing curved trenches that penetrate the side of the container, with at least a portion of a wall defining the curved trench being tangential to the rotation of the drum.

Solid material or parts such as molded, die cast, or machined parts or material such as ore or organic material are loaded inside the container, and the loaded container is immersed in a tank of liquid that will be used for treating the parts or material. The substantially cylindrical container is rotated about its axis when the material is immersed in the solution in order to provide intimate mixing of the solids and liquids, and to generate fluid flow. The fluid flow occurs from the exterior sidewalls of the container to the interior sidewalls and out of the container at or near its axis of rotation at one or both ends. As such, the device allows for the processing of solid material with liquids within the interior portion of a pump impeller. After a sufficient amount of process time has passed the container is removed from the tank of solution and allowed to drain, then rinsed before unloading the solids from the container.

Figure 9A:
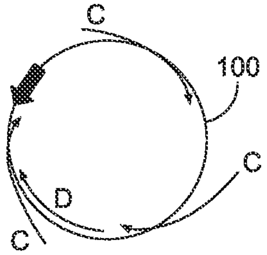
FIG. 9A is a schematic drawing showing the relative motion of the container, the liquid, and the solids inside the container.
Figure 9B:
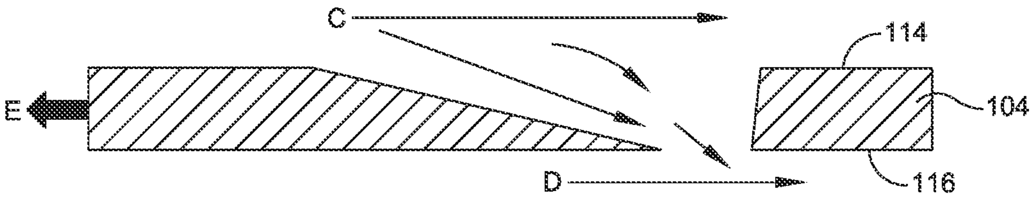
FIG. 9B is another schematic showing the relative motion of the container, liquid, and the solids inside the container.

Referring now to FIGS. 9A and 9B, the material inside the container 100 will move in a direction D opposite to the direction of rotation E, relative to the container sidewall 104. Fluid on the outside of the container will follow the path marked by the arrows labeled C. Therefore, the dimension of the penetration that will be important to the solid material is the distance between the leading edge and the trailing edge in the tangential direction at the interior surface 116 of the container wall 104. The penetration at the interior of the container has been designed to decrease the probability of solids leaving the container by virtue of the fact that the leading edge of the penetration (relative to the solid motion) has a sharp edge that protrudes over a portion of the trench, and potentially over part of the opposite side of the trench, when viewed in a radial direction. Additionally, the probability of solid material coming out of the container is reduced by the momentum of the solution flow entering the container at these openings, which will tend to push the solids back inside the container.

Figure 10A:
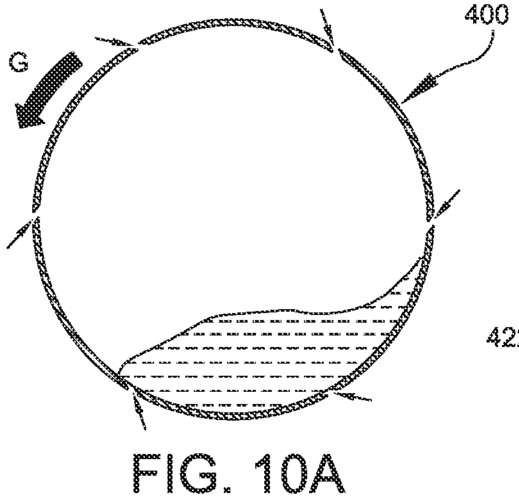
FIG. 10A is a schematic drawing showing the relative motion of a container, the liquid, and the solids inside the container.
Figure 10B:
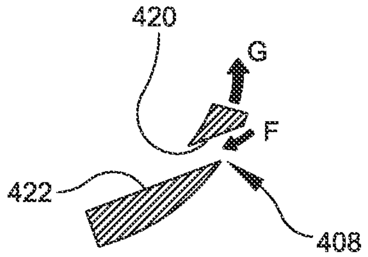
FIG. 10B is another schematic drawing showing the relative motion of a container, the liquid, and the solids inside the container.

Referring now to FIGS. 10A and 10B, another embodiment of a container 400 has a plurality of slots 408, each slot 408 having a leading edge 420 and a trailing edge 422. The container 400 rotates in the direction G, and fluid enters the container along the arrow F through the respective slot 408.

Figure 11A:
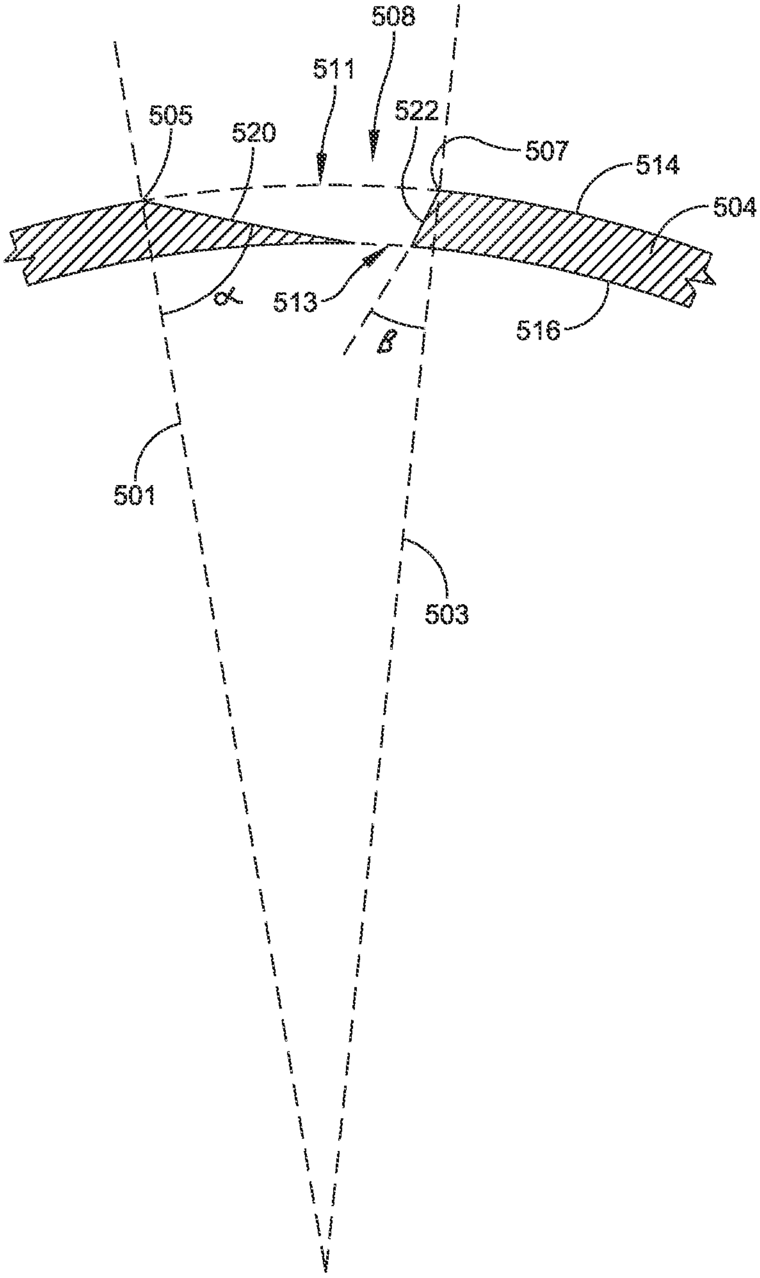
FIG. 11A is a cross sectional view of an embodiment of a slot formed in a container wall; container wall.
Figure 11B:
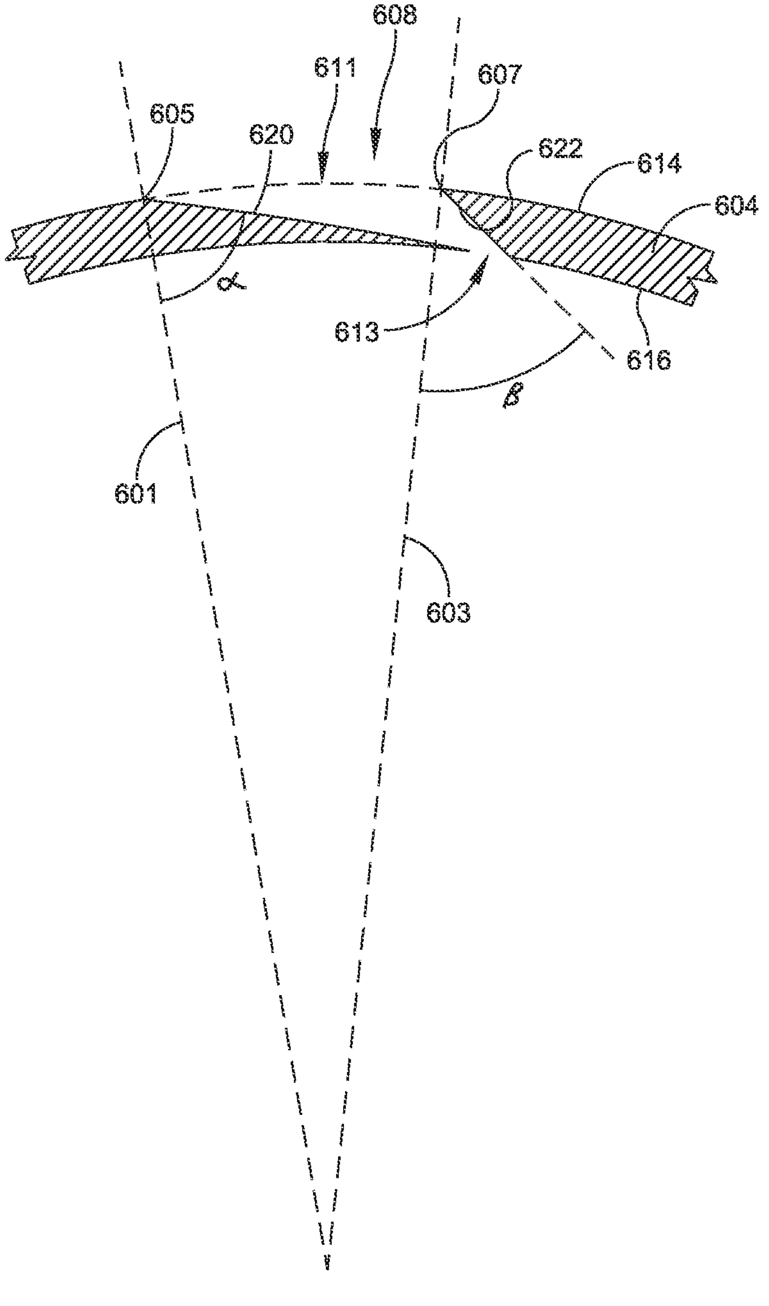
FIG. 11B is a cross sectional view of another embodiment of a slot formed in a container wall.

Referring now to FIGS. 11A and 11B, a partial axial cross section of an embodiment of a slot 508 in which the leading edge 520 and trailing edge 522 do not overlap when viewed in the radial direction is shown in FIG. 11A, and a partial axial cross section of an embodiment of a slot 608 in which the leading edge 620 and trailing edge 622 do overlap when viewed in the radial direction is shown in FIG. 11B.

FIG. 11A shows a container having a cylindrical portion defined by a cylindrical wall 504, which has an outer surface 514 and an inner surface 516. A plurality of circumferentially spaced apart slots 508 are defined in the cylindrical wall 504 and extend from the outer surface 514 of the cylindrical wall 504 to the inner surface 516 of the cylindrical wall 504. Each slot 508 of the plurality of circumferentially spaced apart slots is defined by a first edge portion (leading edge, first surface, first edge wall, or first edge side) 520 forming one edge of the slot and a second edge portion (trailing edge, second surface, second edge wall, or second edge side) 522 forming another edge of the slot. The first edge portion 520 extends at a first angle α with respect to a first radial line 501 from a center of the cylindrical portion to an outer edge 505 of the first edge portion 520, and the second edge portion 522 extends at a second angle β with respect to a second radial line 503 from a center of the cylindrical portion to an outer edge 507 of the second edge portion 522, the first angle α being greater than the second angle β.

The first edge portion 520 and the second edge portion 522 together define a first opening 511 on the outer surface 514 and a second opening 513 on the inner surface 516, the first opening 511 being greater than the second opening 513. A circumferential distance from the outer edge 505 of the first edge portion 520 to the outer edge 507 of the second edge portion 522 is greater than a circumferential distance from an inner edge of the first edge portion to an inner edge of the second edge portion at the second opening 513.

In some embodiments, the outer edge 505 of the first edge portion 520 extends in a line that is aligned with an axial direction of the cylindrical portion of the container. In some embodiments, the outer edge 507 of the second edge portion 522 extends in a line that is aligned with the axial direction of the cylindrical portion of the container.

The geometry of the first edge portion 520 and the second edge portion 522 define a curved path for fluid to pass from the exterior of the container to the interior of the container.

FIG. 11B shows an embodiment in which the outer edge 607 of the second edge portion 622 is radially outward of part of the first edge portion 620. The container includes a cylindrical portion defined by a cylindrical wall 604, which has an outer surface 614 and an inner surface 616. A plurality of circumferentially spaced apart slots 608 are defined in the cylindrical wall 604 and extend from the outer surface 614 of the cylindrical wall 604 to the inner surface 616 of the cylindrical wall 604. Each slot 608 of the plurality of circumferentially spaced apart slots is defined by a first edge portion (leading edge, first surface, first edge wall, or first edge side) 620 forming one edge of the slot and a second edge portion (trailing edge, second surface, second edge wall, or second edge side) 622 forming another edge of the slot. The first edge portion 620 extends at a first angle α with respect to a first radial line 601 from a center of the cylindrical portion to an outer edge 605 of the first edge portion 620, and the second edge portion 622 extends at a second angle β with respect to a second radial line 603 from a center of the cylindrical portion to an outer edge 607 of the second edge portion 622, the first angle α being greater than the second angle β.

The first edge portion 620 and the second edge portion 622 together define a first opening 611 on the outer surface 614 and a second opening 613 on the inner surface 616, the first opening 611 being greater than the second opening 613. A circumferential distance from the outer edge 605 of the first edge portion 620 to the outer edge 607 of the second edge portion 622 is greater than a circumferential distance from an inner edge of the first edge portion to an inner edge of the second edge portion at the second opening 613.

In some embodiments, the outer edge 605 of the first edge portion 620 extends in a line that is aligned with an axial direction of the cylindrical portion of the container. In some embodiments, the outer edge 607 of the second edge portion 622 extends in a line that is aligned with the axial direction of the cylindrical portion of the container.

The geometry of the first edge portion 620 and the second edge portion 622 define a curved path for fluid to pass from the exterior of the container to the interior of the container. Because part of the first edge portion 620 and the outer edge 607 of the second edge portion 622 both lie along the radial line 603, there is not a direct radial path for material positioned within the container to pass in a radial direction out of the container.

In some embodiments, the plurality of circumferentially spaced apart slots are arranged in axially spaced apart rows. In some embodiments, the slots are arranged in an array or a pattern on the container wall.

In some embodiments, the container has a closed second end, and a gear is secured to the closed second end.

In some embodiments, the container is formed with a cylindrical wall portion and a frustoconical wall portion connected to the cylindrical wall portion and located at the open end of the container.

In some embodiments, slots are defined in at least 5% of the container wall. In some embodiments, slots are defined in at least 10% of the container wall. In some embodiments, slots are defined in at least 20% of the container wall. In some embodiments, slots are defined in at least 30% of the container wall. In some embodiments, slots are defined in at least 40% of the container wall. In some embodiments, slots are defined in at least 50% of the container wall.

In some embodiments, at least one component of the shape of the slot is dimensioned and configured based on the rotational speed or other operational parameters associated with the container or associated with the system for processing solid material according to the present disclosure.

Advantages of the present disclosure relative to conventional designs for containers such as barrels and drums used in the barrel plating or leaching or etching industries, or metal or parts finishing industries, metal reclamation, or dyeing industries will be apparent to one of ordinary skill in the art. The present disclosure improves upon the fluid flow and mixing of fluid from the exterior of the container with solid material or parts inside the container by actively drawing fluid into the container as the container is rotated within the solution. This active enhancement of the fluid flow serves to aid in the replenishment of solution and any reactant chemicals it contains, while also enhancing the removal of reaction products and byproducts. This can help to speed up chemical reactions between the solid and liquid phases and make the process more efficient. The enhancement of solution flow into the container will also help to mix the solution more effectively with the solid material in the container.

An additional advantage of the present disclosure is that solid material or parts inside the container with the features described herein will be more effectively held within the container as it rotates in a tank of liquid, even if there is a range of solid sizes inside the container. The size and shape of the penetrations of the interior surface of the container have been designed such that they are small in the direction of rotation (or solid movement relative to the container walls) and preferably shaped so as to direct solids back to the interior of the container as the container rotates. For example, the penetrations can be configured to retain spherical solids that are in the range of 5 microns to 4 inches in diameter within the interior of the container as the container rotates.

A third advantage of the present disclosure is that the combination of the two effects described above further serves to prevent solid material from coming out of the container as it rotates. It will be apparent that the fluid flow from the exterior of the container to the interior of the container at its circumference will serve to entrain solids or push the solid parts into the interior of the container from the sidewalls, as the fluid flows from the circumferential surface toward the interior of the container. This momentum transfer from the fluid to the solid inside the container will help to improve the mixing of the solid inside the container, so that it does not simply slide along the exterior surface as the container is rotated. This will help to provide a uniform chemical process on all exposed surfaces of the solid parts due to superior mixing, as well as providing improved retention of the solid material inside the container.

What is claimed is:

1. A substantially cylindrical container for holding solid material that is to be processed with a liquid, the container comprising:

a generally cylindrical body rotatable about a longitudinal axis;

a plurality of slots formed in the body, each slot extending generally in a circumferential direction with respect to the longitudinal axis, each slot having a leading edge and a trailing edge;

each slot having a component of its shape substantially aligned with the circumferential direction;

the leading edge being tapered toward the trailing edge, the leading edge being configured to direct a liquid to the trailing edge; and the trailing edge being configured to direct a liquid from an exterior of the body to an interior of the body through the respective slot, wherein each slot is curved with respect to an axial direction of the cylindrical portion when the respective slot is viewed in a radial direction.

2. The container of claim 1, wherein the trailing edge is configured to direct a liquid to the interior of the body through a nozzle-like feature.

3. The container of claim 1, each slot having a transverse width aligned with the circumferential direction, the transverse width being small relative to a length of the slot parallel to the longitudinal axis.

4. The container of claim 3, further comprising a tapered edge on the trailing edge of each slot configured to prevent the solid material from falling out of the container along a radial direction.

5. A system for processing solid material comprising:

a tank;

a container for holding solid material that is to be processed with a liquid, the container comprising a generally cylindrical body rotatable about a longitudinal axis;

a plurality of slots formed in the body, each slot extending generally in a circumferential direction with respect to the longitudinal axis, each slot having a leading edge and a trailing edge;

each slot having a component of its shape substantially aligned with the circumferential direction;

the leading edge being tapered toward the trailing edge, the leading edge being configured to direct a liquid to the trailing edge; and the trailing edge being configured to direct from an exterior of the body to an interior of the body through the respective slot, wherein the leading edge and the trailing edge overlap when viewed in a radial direction.

6. The system of claim 5, wherein the trailing edge configured to direct a liquid to the interior of the body through a nozzle-like feature.

7. The system of claim 5, each slot having a transverse width aligned with the circumferential direction, the transverse width being small relative to a length of the slot parallel to the longitudinal axis.

8. The system of claim 7, further comprising a tapered edge on the trailing edge of each slot configured to prevent the solid material from falling out of the container along a radial direction.

9. The system of claim 5, wherein the liquid is useful for one of barrel plating, leaching etching, metal finishing, metal reclamation, and dyeing.

* * * * *